UNITED STATES PATENT OFFICE.

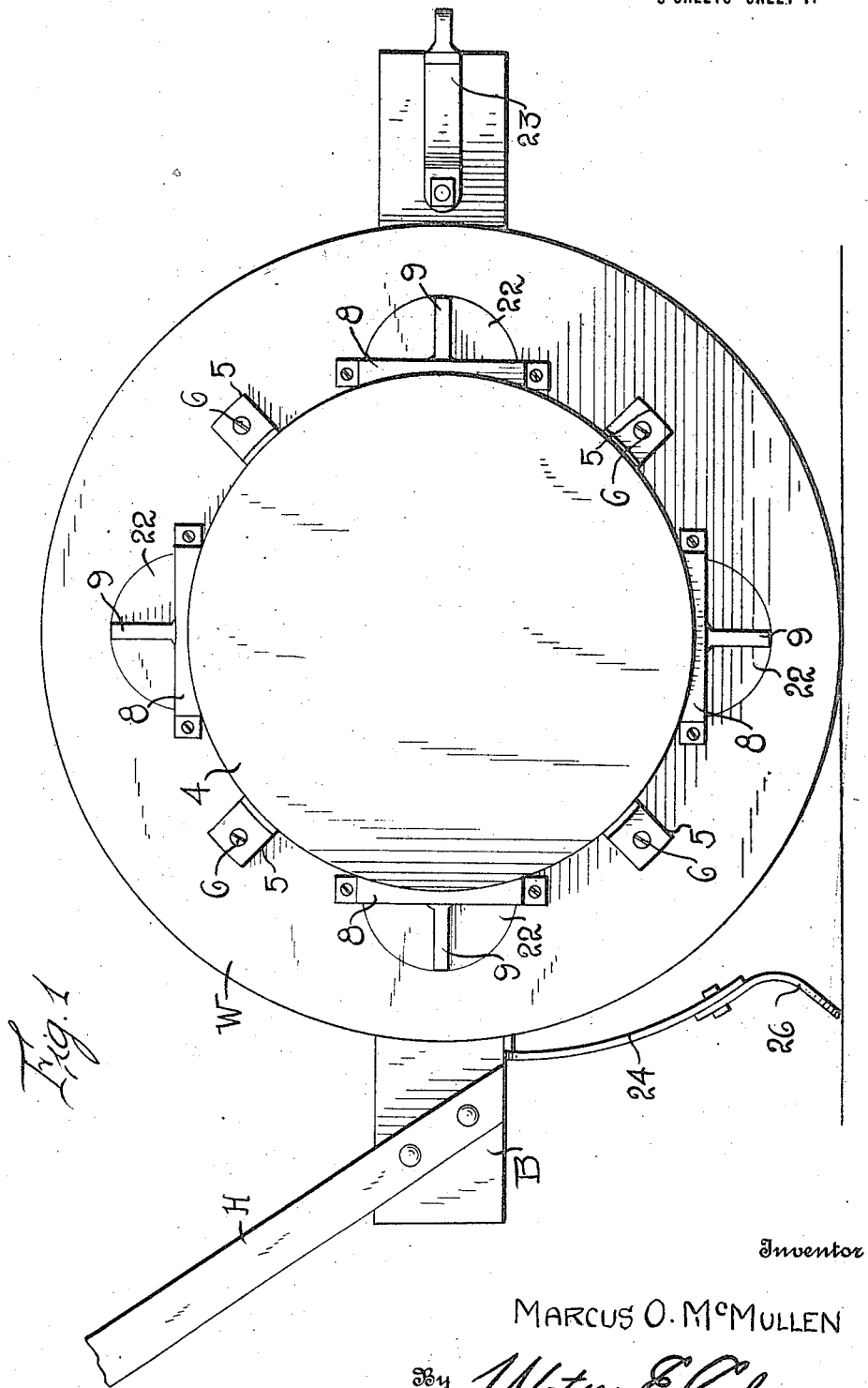

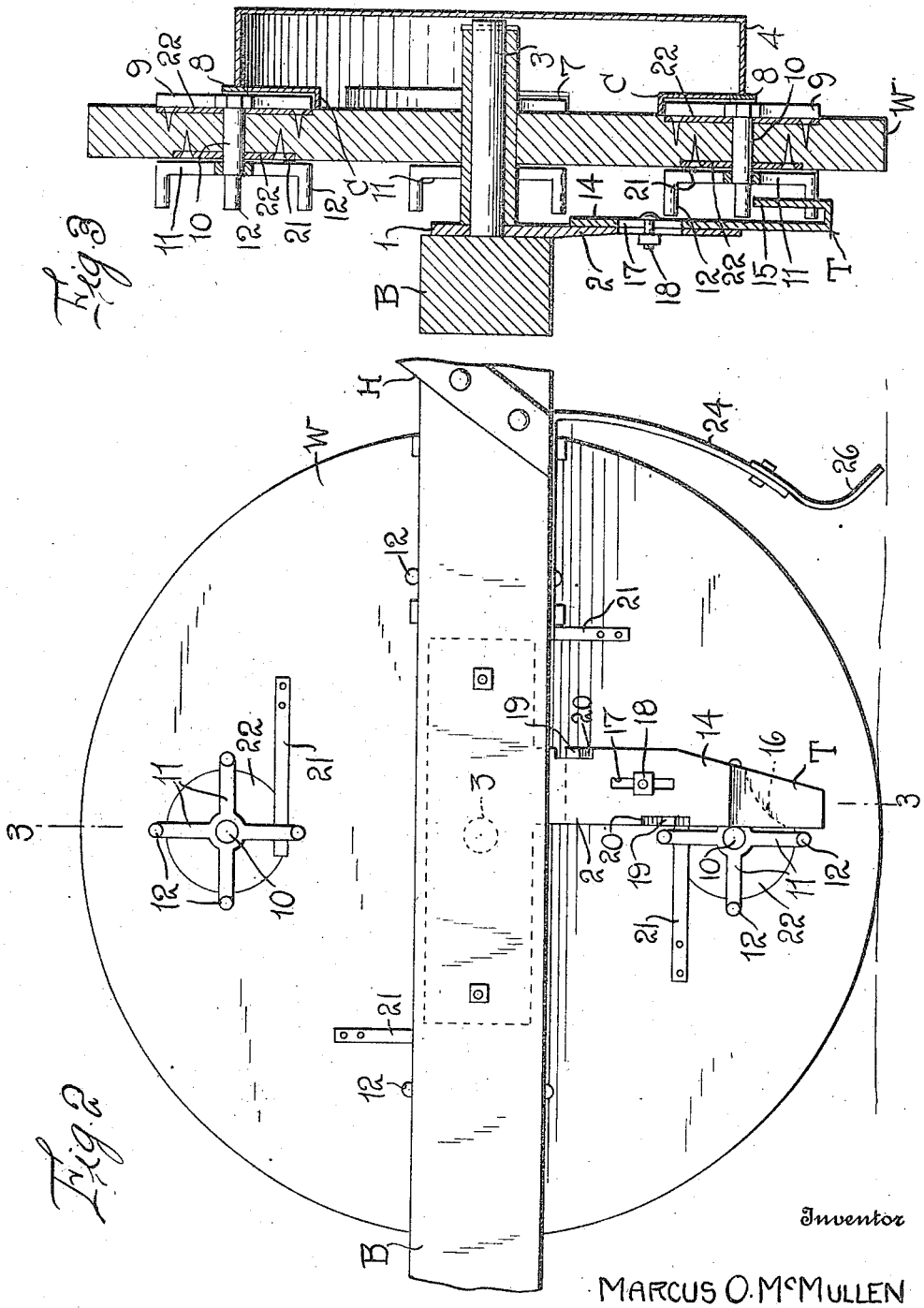

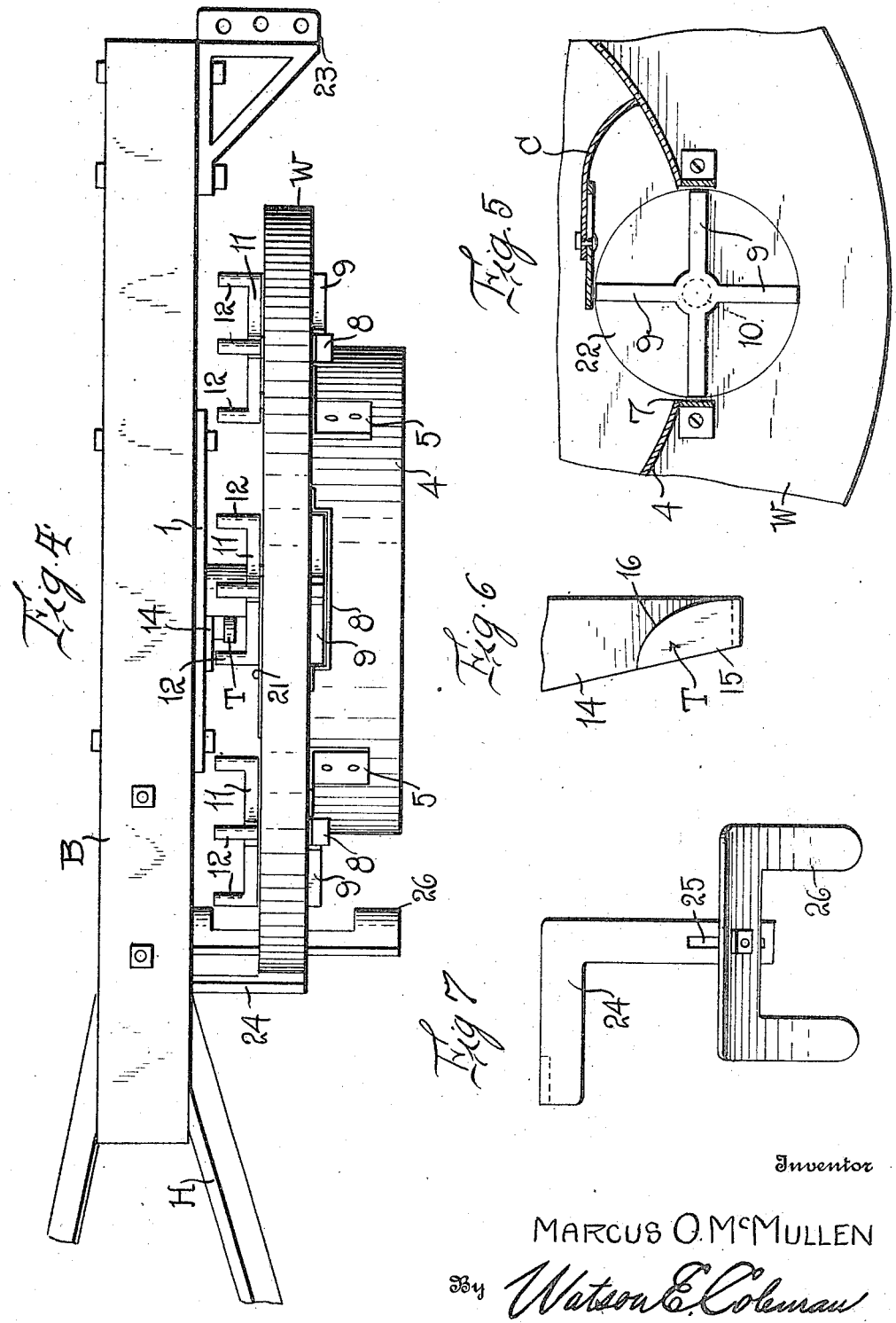

MARCUS O. McMULLEN, OF IVEY, GEORGIA.

PLANTER.

1,236,377.        Specification of Letters Patent.        Patented Aug. 7, 1917.

Application filed November 4, 1916. Serial No. 129,600.

*To all whom it may concern:*

Be it known that I, MARCUS O. McMULLEN, a citizen of the United States, residing at Ivey, in the county of Wilkinson and State of Georgia, have invented certain new and useful Improvements in Planters, of which the following is a specification, reference being had to the accompanying drawings.

This invention relates to certain improvements in planters and has relation more particularly to a device of this general character adapted to be supported by the beam of a plow; and it is an object of the invention to provide a novel and improved planter including a rotating hopper having coacting therewith intermittently operated members for discharging the seed from within the hopper.

It is also an object of the invention to provide a device of this general character including rotatable feeding means together with novel and improved means whereby said feeding means may be intermittently operated.

The invention also has for an object to provide a novel and improved planter including a feeding member having coacting therewith means for varying the quantity of seed delivered by said feeding member.

The invention consists in the details of construction and in the combination and arrangement of the several parts of my improved planter whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a side elevational view of a planter constructed in accordance with an embodiment of my invention;

Fig. 2 is an elevational view of the side of the planter opposite to that shown in Fig. 1, said view being enlarged with certain of the parts omitted;

Fig. 3 is a sectional view taken substantially on the line 3—3 of Fig. 2;

Fig. 4 is a view in top plan of the device as herein set forth;

Fig. 5 is a view partly in elevation and partly in section illustrating certain details of the invention as herein included;

Fig. 6 is a fragmentary view of the lower portion of the trip as herein embodied; and Fig. 7 is an elevational view of the covering member as herein disclosed.

As disclosed in the accompanying drawings, B denotes a conventional beam and which has secured to a side face thereof a plate 1 provided with a depending arm 2. The plate 1 at a predetermined point intermediate its length has operatively engaged therewith the shaft or axle 3 extending outwardly therefrom.

Rotatably mounted upon said shaft or axle 3 is a wheel W preferably of a disk type and which is adapted to contact with the ground so that as the beam B is drawn forwardly the wheel W will be caused to rotate.

4 denotes a box or hopper disposed at the outer side of the wheel W and cylindrical in form with its inner face open whereby when said box or hopper 4 is in applied position the wheel W will serve as a closure for the open face thereof. While the box or hopper 4 may be held to the wheel in any desired manner, I prefer to employ the clips 5 permanently secured to the side wall of the box or hopper 4 and detachably engaged with the wheel W through the medium of the removable screws 6 or other fastening means which may be employed with the same facility. It is also to be noted that the box or hopper 4 is of a major diameter less than the diameter of the wheel W.

The side wall of the box or hopper 4 at predetermined points and preferably at its free or inner marginal portion is provided with the recesses 7, which when the box or hopper 4 is in applied position, results in the production of openings or slots through which the seeds within the box or hopper 4 are adapted to be discharged.

Secured at its opposite extremities to the inner face of the wheel W and extending through each of the recesses 7 and in contact with the base thereof, is a fender or offset strap 8 which results in a discharge spout for the seeds within the box or hopper 4, and said spout is normally maintained closed by a pair of diametrically opposed arms 9 carried by the shaft 10, said shaft 10 being rotatably supported by the strap or fender 8 and the wheel W. The shaft 10 is provided with two pairs of perpendicularly related arms 9 so that upon a quarter turn being imparted to the shaft a closing of the spout is assured. It is also to be noted that each of the arms 9 is of such a length as to extend within the box or hopper 4 so that as the shaft 10 is rotated a quantity of seed will be forced through the spout and delivered to the ground or preferably within a furrow.

The shaft 10 extends beyond the outer face of the wheel W and from said extended portions radiate the arms 11 equal in number to the arms 9 and in perpendicular relation. The outer ends of said arms 11 are provided with the lateral extensions or cranks 12 adapted to contact with the trip member T as the wheel W rotates, said trip T being of such dimensions as to impart a quarter turn to the shaft 10.

As herein embodied, the trip member T consists of an elongated arm 14 secured at its upper end portion to the depending arm 2 of the plate 1 and has its lower end portion returned or upwardly disposed, as at 15, said portion 15 being spaced from the arm 14 and substantially in parallelism therewith with the edge portion thereof engageable with the cranks 12 disposed on a predetermined curvature, as indicated at 16, in order to impart the desired movement to the shaft 10 with a maximum of efficiency.

While the arms 2 and 14 may be connected in any desired manner, it is preferred that the arm 14 be capable of adjustment longitudinally of the arm 2 and for which reason said arms 2 and 14 are provided with the registering longitudinally disposed slots 17 through which is disposed a conventional clamping member 18. In order to prevent the arm 14 from having lateral or pivotal movement relative to the arm 2, I provide the opposite marginal portions of the arm 14 at predetermined longitudinally spaced points with the lugs 19 extending within the recesses 20 produced in the longitudinal margins of the arm 2, as is believed to be clearly disclosed in the accompanying drawings.

Coacting with the arms 11 of each shaft 10 is a flat spring 21 secured at one extremity to the outer face of the wheel W, while the free end portion thereof is adapted to coact with the arms 11 to hold the shaft 10 against rotation except when a crank 12 is brought into contact with the trip T.

It has also been found of advantage to embed within the opposite faces of the wheel W adjacent each set of arms 9 and 11 the wear plates 22 for a purpose which is believed to be self-evident as it is my purpose to have the wheel W comprise a wooden disk.

Adjustably engaged with the inner face of the wheel W and within the box or hopper 4 when in applied position is a cap C affording a housing within which is adapted to travel the arms 9 when disposed within said box or hopper 4 and whereby the amount of seed to be delivered may be regulated. In order to control the quantity of seed it is to be understood that said cap C is moved relatively to the adjacent shaft 10.

The forward end of the beam B has secured to the same side thereof as the plate 1 the clevis or hitch 23 while the rear end portion of the beam B is provided with the handles H of a conventional type. The under surface of the rear portion of the beam B has secured thereto the upper end portion of an arm 24, the depending portion of said arm 24 being disposed on a curvature closely approaching the periphery of the wheel W, and said arm 24 is offset in order to bring the depending portion thereof substantially directly behind said wheel. The lower end portion of the arm 24 is provided with an elongated slot 25 to afford an adjustable connection for the fork 26 herein disclosed as substantially U-shaped in form and which is constantly urged toward the ground through the inherent resiliency of the arm 24 whereby it will be perceived that after the seed have been deposited upon the ground or within a furrow the same are covered over by the action of the fork 26.

From the foregoing description, it is thought to be obvious that a planter constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. A seeder including a wheel provided with a hopper, said hopper having a discharge opening, a rotatable member including arms adapted to extend within the hopper through the discharge opening thereof, said arms serving to normally maintain said discharge opening closed, and means for intermittently rotating the rotatable member.

2. A seeder including a wheel provided with a hopper, said hopper having a discharge opening, a rotatable member including arms adapted to extend within the hopper through the discharge opening thereof, said arms serving to normally maintain said discharge opening closed, means for intermittently rotating the rotatable member, and means adjustable relative to the discharge opening for controlling the quantity of seeds discharged by the arms.

3. A planter comprising a beam, a wheel rotatably supported thereby and adapted to contact with the ground, said wheel being provided with a hopper having a discharge opening, a shaft rotatably supported by the wheel and intersecting the discharge opening, arms radiating from said shaft and adapted to travel within the hopper, and coacting means carried by the beam and shaft for intermittently rotating said shaft.

4. A planter comprising a beam, a wheel rotatably supported thereby and adapted to contact with the ground, said wheel being provided with a hopper having a discharge opening, a shaft rotatably supported by the wheel and intersecting the discharge opening, arms radiating from said shaft and adapted to travel within the hopper, coacting means carried by the beam and shaft for intermittently rotating said shaft, and a fender secured to the wheel and disposed longitudinally of the discharge opening, said fender affording a mounting for the shaft and coacting with the wheel to afford a discharge spout.

5. A seeder including a wheel provided with a hopper, said hopper having a discharge opening, a rotatable member including arms adapted to extend within the hopper through the discharge opening thereof, said arms serving to normally maintain said discharge opening closed, means for intermittently rotating the rotatable member, and means for normally holding the shaft against rotation.

6. A planter comprising a beam, a wheel rotatably supported thereby and provided with a hopper, said hopper having a discharge opening, a rotatable feeding member coacting with said discharge opening, said feeding member including a shaft disposed through the wheel and extending therebeyond, arms radiating from the extended portion of said shaft, and an arm depending from the beam and having its lower end portion returned, said returned portion being adapted to contact with an arm of the shaft upon rotation of the wheel for intermittently rotating said shaft.

7. A planter comprising a beam, a wheel rotatably supported thereby and provided with a hopper, said hopper having a discharge opening, a rotatable feeding member coacting with said discharge opening, said feeding member including a shaft disposed through the wheel and extending therebeyond, arms radiating from the extended portion of said shaft, an arm depending from the beam and having its lower end portion returned, said returned portion being adapted to contact with an arm of the shaft upon rotation of the wheel for intermittently rotating said shaft, and means carried by the wheel and coacting with the arms of the shaft for holding said shaft normally aganist rotation.

8. A planter comprising a beam, a wheel rotatably supported thereby and provided with a hopper, said hopper having a discharge opening, a rotatable feeding member coacting with said discharge opening, said feeding member including a shaft disposed through the wheel and extending therebeyond, arms radiating from the extended portion of said shaft, an arm depending from the beam and having its lower end portion returned, said returned portion being adapted to contact with an arm of the shaft upon rotation of the wheel for intermittently rotating said shaft, and a flat spring secured to the wheel and coacting with the arm of the shaft for normally holding said shaft against rotation.

9. A planter comprising a beam, a wheel rotatably supported thereby and provided with a hopper, said hopper having a discharge opening, a rotatable feeding member coacting with said discharge opening, said feeding member including a shaft disposed through the wheel and extending therebeyond, arms radiating from the extended portion of said shaft, and an arm depending from the beam and having its lower end portion returned, said returned portion being adapted to contact with an arm of the shaft upon rotation of the wheel for intermittently rotating said shaft, said arm being adjustable relatively to the beam.

In testimony whereof I hereunto affix my signature in the presence of two witnesses.

MARCUS O. McMULLEN.

Witnesses:
D. S. SANFORD,
J. C. COOPER.

Copies of this patent may be obtained for five cents each, by addressing the "Commissioner of Patents, Washington, D. C."